US008566935B2

(12) United States Patent
Lagar-Cavilla et al.

(10) Patent No.: US 8,566,935 B2
(45) Date of Patent: Oct. 22, 2013

(54) BALANCING MALWARE ROOTKIT DETECTION WITH POWER CONSUMPTION ON MOBILE DEVICES

(75) Inventors: Horacio Andres Lagar-Cavilla, Morris Plains, NJ (US); Jeffrey Bickford, Somerset, NJ (US); Vinod Ganapathy, Piscataway, NJ (US); Liviu Iftode, Princeton, NJ (US); Alexander Varshavsky, East Hanover, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 13/106,479

(22) Filed: May 12, 2011

(65) Prior Publication Data

US 2012/0291126 A1 Nov. 15, 2012

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| 7,096,501 | B2 | 8/2006 | Kouznetsov | |
| 7,540,031 | B2 | 5/2009 | Kouznetsov | |
| 7,827,611 | B2 | 11/2010 | Kouznetsov | |
| 7,861,303 | B2 | 12/2010 | Kouznetsov | |
| 2008/0250415 | A1* | 10/2008 | Illikkal et al. | 718/103 |
| 2009/0222923 | A1* | 9/2009 | Dixon | 726/24 |
| 2010/0037321 | A1 | 2/2010 | Oz | |
| 2010/0313270 | A1 | 12/2010 | Kim | |
| 2010/0328064 | A1 | 12/2010 | Rogel | |
| 2011/0047620 | A1 | 2/2011 | Mahaffey | |

OTHER PUBLICATIONS

"Countering Kernel Rootkits with Lightweight Hook Protection" Zhi Wang, Xuxian Jian, Proceedings of the 16th ACM conference on Computer and communications security, 2009.*

* cited by examiner

*Primary Examiner* — Edan Orgad
*Assistant Examiner* — Harris Wang
(74) *Attorney, Agent, or Firm* — Hartman & Citrin LLC

(57) ABSTRACT

The subject disclosure presents a novel technique for balancing the tradeoff between security monitoring and energy consumption on mobile devices. Security/energy tradeoffs for host-based detectors focusing on rootkits are analyzed along two axes: a scanning frequency, and a surface of attack. Experimental results are applied to a hypervisor-based framework, and a sweet spot is identified to minimize both energy consumption and a window of vulnerability for critical operating system objects such as code pages and kernel data.

20 Claims, 19 Drawing Sheets

Lmbench

BALANCING MALWARE ROOTKIT DETECTION WITH POWER CONSUMPTION ON MOBILE DEVICES

GOVERNMENT INTERESTS

This invention was made in part with U.S. Government support under National Science Foundation (NSF) Grant Nos. CNS-0831268, CNS-0915394, CNS-0931992 and CNS-0952128, and the U.S. Army CERDEC. The government has certain rights in this invention.

BACKGROUND OF THE SUBJECT DISCLOSURE

1. Field of the Subject Disclosure

The subject disclosure relates to balancing malware rootkit detection with power consumption on mobile devices. In particular, the subject disclosure relates to optimizing power consumption by modulating the rootkit detection as a function of time and coverage.

2. Background of the Subject Disclosure

Mobile electronic devices, or mobile devices, have become an integral part of our everyday lives. Cellular telephones, smartphones, netbooks, and several other devices are used by billions to perform everyday tasks for communication, scheduling, etc. Essentially, the core components of historically larger computers, such as transceivers, displays, storage, and powerful processors are being miniaturized and crammed into small portable devices that are becoming more and more ubiquitous.

With the benefits of packing computing power and networking into a small package also come the costs. One increasing problem is that of malicious software, or malware. Malware is created by malicious entities for several nefarious purposes, spreads itself like a computer virus, and may cripple or even completely disable an electronic device. A particularly potent form of malware is a rootkit, so called because they target the root of the system, i.e., the operating system (OS) kernel itself. By infecting the code and data of the OS kernel, rootkits gain control over the layer traditionally considered the trusted computing base (TCB). Rootkits are therefore able to evade standard user-space malware detectors, such as signature-based scanners. Further, rootkits enable other attacks by hiding malicious processes, allow attackers to stealthily retain long-term control over infected devices, and serve as stepping stones for other attacks such as key-loggers or backdoors.

Early rootkits attempted to hide the presence of malicious processes by compromising system utilities that are used for diagnostics. For instance, a rootkit that replaces the UNIX LS and PS binaries with infected versions can hide the presence of malicious files and processes. Such rootkits are easy to detect by an uncompromised TCB that certifies the integrity of user-space utilities with checksums.

The next generation of rootkits attempt to evade detection by affecting the integrity of kernel code. Such corruption is usually achieved by coercing the system into loading malicious kernel modules. Once a rootkit has gained kernel execution privileges, it can mislead all detection attempts from user or kernel space.

A large majority of rootkits today corrupt kernel control data by modifying function pointers in data structures such as the system call table or the interrupt descriptor table. This attack technique allows rootkits to redirect control to attacker code when the kernel is invoked. Finally, a recent study has reported a 600% increase in the number of rootkits in a three year period between 2004 and 2006. As this explosive growth continues, the increasing complexity of the hardware and software stack of mobile devices, coupled with the increasing economic value of personal data stored on mobile devices, point to an impending adoption of rootkits in the mobile malware arena.

Several approaches currently exist for defending against malware. However, as mentioned above, traditional signature based scanning does not protect against subversive rootkits. Signature based scanning may be supplemented with more powerful techniques, such as those that deploy behavior-based detection algorithms. Existing methods for detecting rootkits include the use of code integrity monitors such as Patagonix, and kernel data integrity monitors such as Gibraltar. Patagonix offers protection against malicious code in the kernel by checking the integrity of static code pages (kernel inclusive). Gibraltar offers protection against malicious data in the kernel by scanning the kernel's data segment and ensuring that its data structures satisfy certain integrity properties, which are normally violated in rootkit-infected kernels.

This checking of the integrity of all kernel data structures and executable code is a thorough process, but requires significant processing overhead. With mobile devices, this leads to another problem: excessive power consumption. Security mechanisms today focus on well-provisioned computers such as heavy-duty servers or user desktops. Mobile devices present a fundamental departure from these classes of machine because they are critically resource-constrained.

While advances throughout the last decade in mobile processor, GPU, and wireless capabilities have been staggering, the hard fact is that mobile devices utilize batteries with a limited amount of stored power. Without the limit of resource constraints, security mechanisms will check everything they can, all the time. In a mobile device aggressively performing checks on large sets of security targets will inexorably lead to resource exhaustion and the inability to carry on useful tasks. However, no currently known approach addresses the problem of providing security mechanisms in a battery-constrained environment.

What is therefore needed is a modified rootkit detector or scanner that balances rootkit detection with energy consumption.

SUMMARY OF THE SUBJECT DISCLOSURE

The subject disclosure provides a framework to quantify the tradeoff in malware detection on mobile devices between security and power consumption. Existing hypervisor-based rootkit detectors are customized for mobile platforms. These optimizations leverage memory management hardware and may additionally be used for other hypervisor-based memory inspection mechanisms. A system controller regulates how often and to what degree the detectors function to determine a window of vulnerability aggregate. The resulting window of vulnerability aggregate can be used to obtain an optimal compromise between energy and security. The compromise provides a reasonable degree of assurance in the security for a mobile device without completely depleting the battery, and is accomplished by characterizing the tradeoff along two axes. First, security can be traded off by modulating the coverage of the surface of attacks a malware detector will cover. Second, security can be traded off by modulating the frequency with which to invoke malware detection. In other words, one axis quantifies how often the detector performs checks in order to detect the presence of a rootkit, and the other axis is the number and type of data that is covered when performing these checks. The surface of attack includes running code, existing data, and among these are types of data that need not be checked frequently, or at all. Further event-based vs. polling-based modes are compared to trigger security checks.

In one exemplary embodiment, the subject disclosure is a method for adjusting rootkit detection. The rootkit detection is performed on a plurality of pages on a guest domain of a hypervisor within the memory of a mobile device, and includes determining an amount of energy consumed during a rootkit detection, adjusting a frequency of the rootkit detection, and adjusting an attack surface to be detected during the rootkit detection. The adjustments are made to balance security with an amount of energy consumed by comparing the amount of energy consumed with a maximum threshold and a minimum threshold. The frequency and the attack surface are increased when the amount of energy consumed is below the minimum threshold, and are decreased when the amount of energy consumed is below the minimum threshold.

In another exemplary embodiment, the subject disclosure is a computer program product including a plurality of logic units stored on a computer-readable medium, the plurality of logic units including instructions for determining an amount of energy consumed during a rootkit detection, adjusting a frequency of the rootkit detection, and adjusting an attack surface to be detected during the rootkit detection.

In yet another exemplary embodiment, the present subject disclosure is a mobile device, including a processor, a memory coupled to the processor, a hypervisor on the memory, a guest domain on the hypervisor, the guest domain including at least an operating system and user software, and a trusted domain on the hypervisor, the trusted domain including a rootkit detector and a controller configured to determine an amount of energy consumed during a rootkit detection, adjust a frequency of the rootkit detection, and adjust an attack surface to be detected during the rootkit detection. The adjustments are made to balance security with the amount of energy consumed. The mobile device further includes a transceiver enabling communication with a mobile network, wherein the rootkit detector is configured to transmit an infected page to a host-based rootkit detector on the network. A user interface or a hardware switch is provided to enable adjustment of the frequency and the attack surface.

Consequently, mobile system designers will be able to quantify the balance between the security guarantees the platform will offer and its impact on battery life. Manufacturers and service providers can identify best-compromise solution along the surface of attacks being defended against, and the frequency with which defenses are invoked.

DETAILED DESCRIPTION OF THE SUBJECT DISCLOSURE

Figure 1:
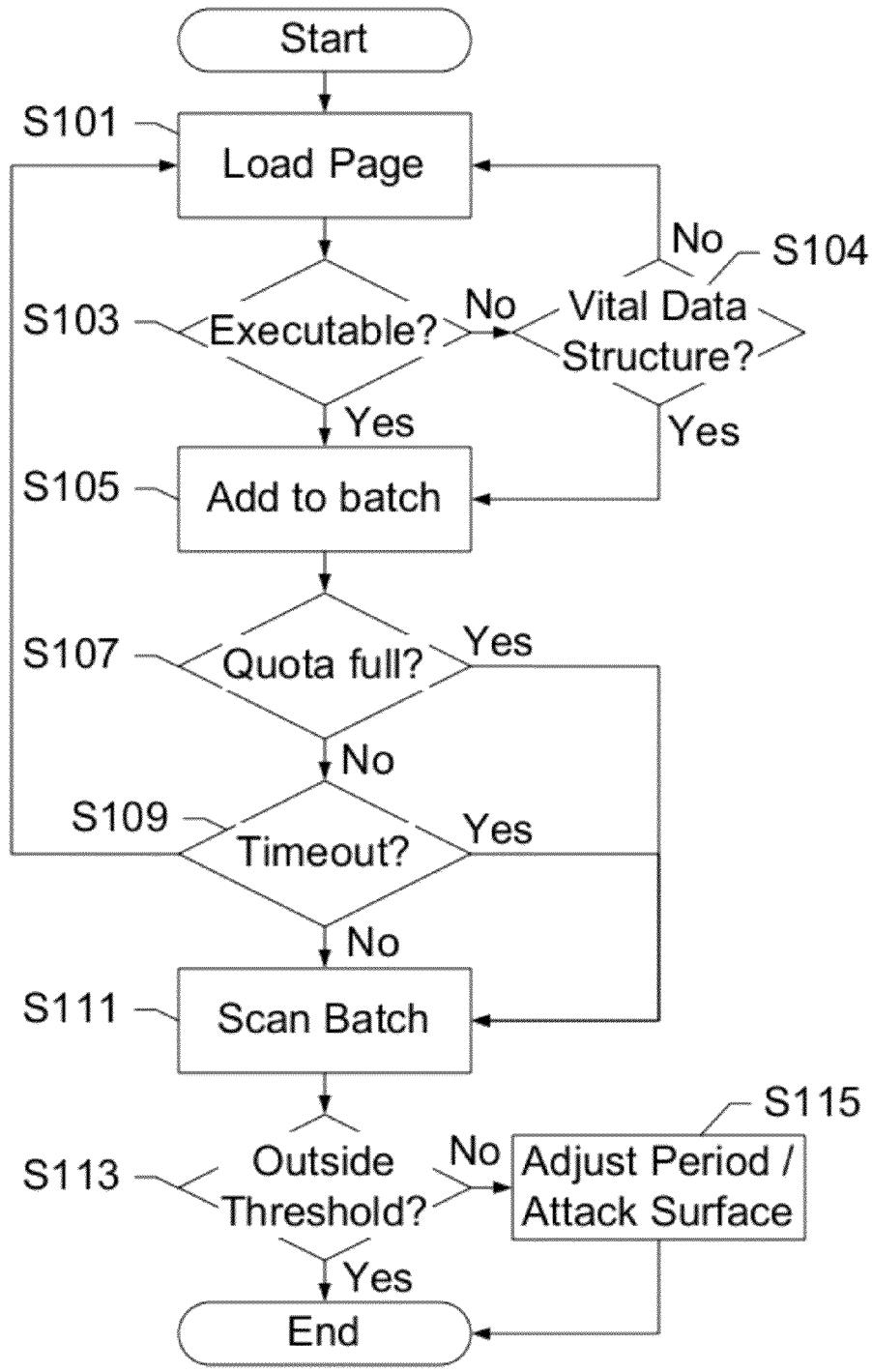
FIG. 1 shows a method for detecting rootkits, according to an exemplary embodiment of the subject disclosure.

The subject disclosure presents a novel technique for balancing the tradeoff between security monitoring and energy consumption on mobile devices. Security/energy tradeoffs for host-based detectors focusing on rootkits are analyzed along two axes: a scanning frequency, and a surface of attack. Experimental results are applied to a hypervisor-based framework, and a sweet spot is identified to minimize both energy consumption and a window of vulnerability for critical operating system objects such as code pages and kernel data.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A mobile device also includes a network interface enabling the transceiver to connect to a network. One example of a network interface is a Subscriber Identity Module (SIM) card. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include Wi-Fi and Bluetooth® networks, with communication being enabled by hardware elements called "transceivers." Wireless communication devices may have more than one transceiver, capable of communicating over different networks. For example, a cellular telephone can include a GPRS transceiver for communicating with a cellular base station, a Wi-Fi transceiver for communicating with a Wi-Fi network, and a Bluetooth® transceiver for communicating with a Bluetooth® device. A network typically includes a plurality of elements that host logic for performing tasks on the network.

The subject disclosure involves detection of rootkit malware and preventing infected pages from being executed. A rootkit is a type of malware that infects the executable code and data of an operating system (OS) kernel. By infecting the kernel itself, rootkits gain control over the layer historically referred to as the trusted computing base (TCB).

A kernel is a central component of most operating systems. A kernel includes at least executable code, and kernel data. Kernel code includes executables such as compiled code, system utilities, and services associated with the operating system. Kernel data includes non-executable control data such as system call tables, interrupt descriptor tables, function pointers, and so on. Further, kernel data includes non-control kernel data such as parameters controlling key cryptographic routines. Both code and data are stored on memory pages, or pages. A page, as used herein and throughout this disclosure, is a unit of granularity for both code and data.

According to the subject disclosure, the OS kernel is stored on a guest domain that resides on a hypervisor, while a rootkit detector, or detector, is stored on a trusted domain on the hypervisor. Generally, a hypervisor is a software layer that mediates the sharing of underlying hardware resources between several virtual operating systems, or domains. A "virtual machine" is a software implementation or "emulation" of a machine, i.e. a computer, which executes a computer program like a physical machine would. By using a "hardware abstraction layer", the hypervisor will handle interrupts from the operating system to the processor, schedule processor time among the guest operating systems and allocate cores to virtual machines, manage devices and allocate memory. Further, a hypervisor can provide a guest operating system with access to a generic network interface by translating those access calls to a particular device driver, said interface being shared between the different guest operating systems. Such "virtual network interfaces" enable the creation of a "virtual network" wherein each virtual machine has its own private unique network address to communicate with each other and with the hypervisor or host operating system. By managing the virtual network, logic on the hypervisor can be deployed to secure each virtual machine using a different security model, such that virtual machines are restricted from accessing data stored on each other's memory units.

For the following description, it can be assumed that most correspondingly labeled structures across the figures (e.g., 240 and 340, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a method for detecting rootkits, according to an exemplary embodiment of the subject disclosure. The method starts with loading a page S101 from an operating system on a guest domain. The page is either a code page or a data page. A code page is loaded when it is scheduled for execution in the guest domain, while a data page is loaded when it is being modified in the guest domain. Next, a determination of what type of page is performed S103. A reference to the page is added to a batch S105 to be subsequently processed by the rootkit scanner. If the page is a kernel data page that is undergoing a modification in S101, then it is determined whether or not the data is part of a vital data structure S104. If not, then the page is allowed to be modified, and the next page is loaded. If the data page is associated with a vital data structure, then it is added to the batch S105 to undergo scanning at some point in the future.

A determination is made S107 as to the progress of the batch. When the batch reaches a certain quota, all pages in the batch are scanned by the rootkit scanner S111. If the quota is not full, a determination is made S109 as to whether a timer has timed out. This enables scanning of pages even without having a full quota, thereby reducing the window of vulnerability of the system. A window of vulnerability is a period between scans, and its relationship with power consumption is further described below. If the timer has not timed out, the next page is loaded and the process resumes. If the timer has timed out, the batch is scanned S111 regardless of how large it is. Scanning the batch S111 includes different steps for different types of pages, as further described below.

Additionally, a power consumption of the mobile device is determined S113. This includes measuring the rate of consumption during the scanning, as well as detecting a percentage of power remaining, for instance in a battery. If power consumption is not in excess of a defined threshold or ideal consumption, then the time period and/or attack surface is adjusted S115. This step includes increasing a time period between scans by adjusting the timeout of the timer, adjusting the quota by increasing the size of the batch, or instructing the scanner to scan only some data structures and to ignore other data pages. In case the mobile device is plugged into a constant power source, for instance while the battery is charging, the time period between scans, the size of the batch, and the attack surface are automatically adjusted to provide a maximum level of security. These and other adjustments are further described in more detail below.

Figures 2A, 2B:
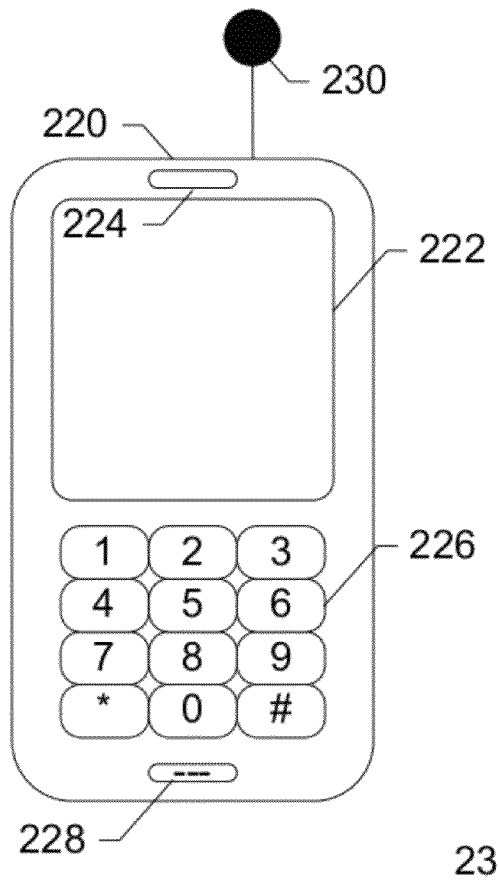
FIGS. 2A-2B respectively show the components of a mobile device, according to an exemplary embodiment of the subject disclosure.

FIGS. 2A and 2B respectively show the components of a mobile device, according to an exemplary embodiment of the subject disclosure. Referring to FIG. 2A, a mobile device 220 includes a display 222, a speaker 224, an input device such as keyboard 226 or microphone 228, and an antenna 230. Display 222 includes touchscreens that may be used as both input and output devices. Antenna 230 receives cellular radio signals over the air to be processed by the internal components of mobile device 220. As is well-understood in the art, other features such as external speakers, input buttons/sliders, slide out keyboards, etc. are not shown but can be incorporated into other exemplary embodiments of the mobile device.

Referring now to FIG. 2B, the internal components of mobile device 220 include a transceiver 232 in communication with a Central Processing Unit (CPU) 234 that is in turn in communication with a memory 236 storing logic 237. All the components are powered by a battery 238. CPU 234 is any Intel® or ARM® based microprocessor known in the art and ideal for operating portable electronic devices such as mobile device 220. Memory 236 stores logic 237, as well as other software and databases, such as firmware, hypervisors, host operating systems, etc. Transceiver 232, via antenna 230, receives, processes, and transmits radio signals, such as GPRS, cellular radio, Bluetooth®, Wi-Fi, etc. In other exemplary embodiments, features such as Global Positioning System (GPS) units, accelerometers, infra-red (IR) transceivers, etc. are not shown but can be included in mobile device 220. Other types of processors can be used and may take different forms depending on whether the mobile device is a cellular telephone, laptop computer, etc.

Logic 237 includes at least a hypervisor, a guest domain on the hypervisor, and a trusted domain on the hypervisor. The hypervisor includes a controller that receives or intercepts pages being executed or modified by an OS on the guest domain, and the trusted domain includes a malware scanner, such as Patagonix and Gibraltar described above, to scan the pages for rootkit activity. The controller operates via the method described herein, and using the below-described systems.

Figure 3:
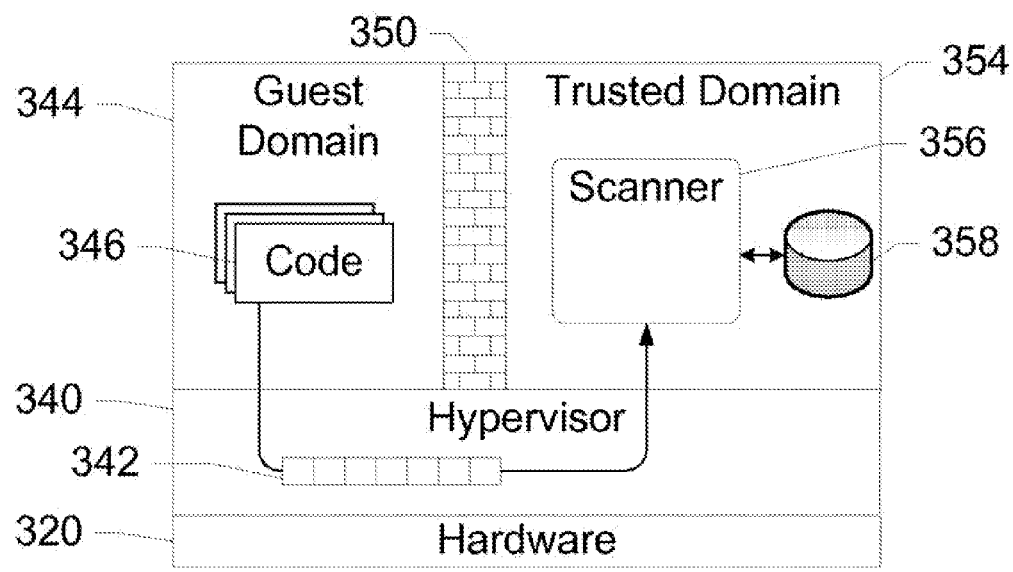
FIG. 3 shows a system for checking code integrity on a mobile device, according to an exemplary embodiment of the subject disclosure.

FIG. 3 shows a system for checking code integrity on a mobile device, according to an exemplary embodiment of the subject disclosure. A hypervisor 340 resides on a memory of mobile device 320. Hardware 320 includes the components of a mobile device such as the one described in FIGS. 2A-2B. Hypervisor 340 mediates between hardware 320 and domains 344 and 354, and guarantees isolation 350 between the guest domain (the monitored system) 344 and the trusted domain (the monitoring tool) 354. Guest domain 344 includes an operating system having code pages 346, among other pages that are not shown. Trusted domain 354 includes a malware scanner 356, such as the Patagonix or Gibraltar scanners described above, a hash database 358, and other minimal logic that is not shown. In this embodiment, hypervisor 340 and the trusted domain 354 together form the Trusted Computing Base (TCB) of the system. When trusted domain 354 detects a compromised page, it is capable of taking over the user interface on the mobile device 320, alerting the user, and providing containment options.

In this exemplary embodiment, malware scanner 356 acts in a manner similar to known code integrity monitoring systems such as Patagonix. In other words, it provides mechanisms to ensure that all code 346 executing on the system belongs to a whitelist of pre-approved code stored in hash database 358. For instance, rootkits that modify system utilities or kernel code can be detected if the modified code is not in the whitelist, while certain data-modifying rootkits, e.g., those that modify kernel data pages that should not be modified during normal operation, are also detected. A non-executable (NX) page table 342 is stored on the hypervisor, and is used to detect and identify all executing code, including kernel code, system utilities, and other user processes.

Hypervisor 340 first sets an NX-bit on all code pages 346 in guest domain 344. When a page 346 is first scheduled for execution, the NX bit causes a processor fault. Hypervisor 340 receives the fault, pauses the guest domain and places information about the fault in the page table 342, which is accessed by the scanner 356 executing in the trusted domain. Scanner 356 hashes the page, and compares the executing code to a whitelist of known software, the whitelist including hashes of all approved code pages and stored in hash database 358. Hash database 358 includes at least an instruction number, a relative position, a process identity and the cryptographic hash for each known page. This information is intended to optimize the search that happens within hash database 358. The result of the search identifies the page, the originating code, and whether or not this page is populated with well known code that comes from reputed vendors, such as known OS executables and so on. Several different versions of the OS kernel could be used to populate this database as well as well known device drivers and commonly used applications.

Since pages are considered to be either modifiable or executable, once a page is executed and does not change, no further scanning needs to be performed for that page. Thus, beyond this initial bootstrapping phase, the kernel working set and long-lived processes represent no additional work for scanner 356. Further, scanner 356 uses optimizations to ensure fast verification of code pages. It remembers pages of code that have been approved and that have not changed. Thus, short-lived by recurring processes, such as "grep" will result in hypervisor work as new page tables are created, but no scanner work, due to reuse of resident unmodified code pages. The scanner is aware of the entry point of each binary in its whitelist—the first detection of a new binary should match an entry point in the whitelist. For approved binaries, an associated address page (defined by the base address of the current page table) is stored as well as the segment of the address space the binary occupies. In other words, pages within the same segment only match pages of the same binary. The subject disclosure improves the efficiency of this system by enabling the hypervisor to trigger the scanning process at an adjustable frequency, and allowing code pages to be batched for scanning. These modifications are further described below.

Figure 4:
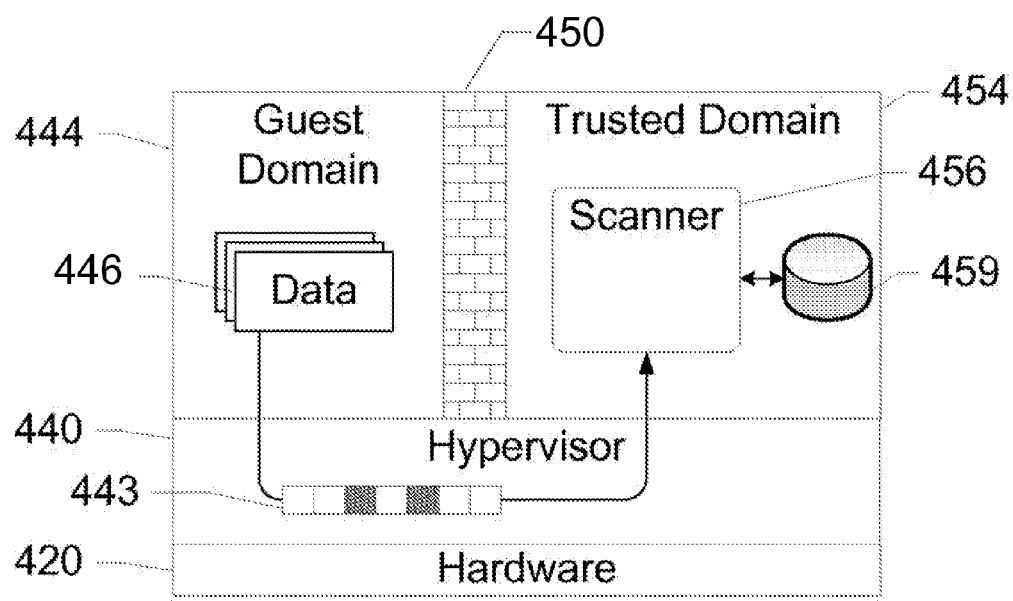
FIG. 4 shows a system for checking data integrity on a mobile device, according to an exemplary embodiment of the subject disclosure.

Meanwhile, FIG. 4 shows a system for checking data integrity on a mobile device, according to an exemplary embodiment of the subject disclosure. Similar to FIG. 3, a hypervisor 440 resides on a memory of mobile device 420. Hardware 420 includes the components of a mobile device such as the one described in FIGS. 2A-2B. Hypervisor 440 mediates between hardware 420 and domains 444 and 454, and guarantees isolation 450 between the guest domain (the monitored system) 444 and the trusted domain (the monitoring tool) 454. In this embodiment, guest domain 444 includes an operating system having kernel data pages 446, among other pages that are not shown, such as executable code pages. Trusted domain 454 includes a malware scanner 456, such as the Patagonix or Gibraltar scanners described above, a database of invariants 459, and other minimal logic that is not shown. Hypervisor 440 and the trusted domain 454 together form the Trusted Computing Base (TCB) of the system. When trusted domain 454 detects a compromised page, it is capable of taking over the user interface on the mobile device 420, alerting the user, and providing containment options.

Hypervisor 440 includes logic to periodically fetch data pages 446 from guest kernel 444, and provide them to scanner 456 to be reconstructed. Scanner 456 starts with a set of kernel root symbols, whose memory locations are fixed. Using OS type definitions, scanner 456 identifies pointers in these root symbols, and recursively fetches more pages that contain data structures referenced by these pointers. Once data structures have been reconstructed, data structure invariants that specify kernel integrity constraints are verified by referring to invariant database 459. Some invariants are simple to verify: the values of function pointers must be addresses of known functions while the entries of the system call table should remain constant during the execution of the kernel. Other more complex invariants span sophisticated data structures, for instance, each process that is scheduled for execution must have an entry in the linked list of active processes on the system. In this exemplary embodiment, the scanner 456 undergoes a training phase including observing the execution of an infected kernel, executing several benign workloads, and inferring a large number of data structure invariants.

Besides uniquely modifying integrity scanners to function over a hypervisor, the subject disclosure has also modified traditional kernel integrity scanners by including a shadow page table 443 within hypervisor 440. This allows scanner 456 to focus the application of integrity constraints on just those data pages that are modified by the guest domain 444. The shadow page table (SPT) 443 grants fine-grained control over the permission bits of virtual-to-physical memory translation. In particular, SPT 443 is used to cause faults on a first attempt to modify a page, similar to the NX fault of the previous embodiment. Hypervisor 440 catches these faults and records them in a "log-dirty" bitmap within SPT 443. Scanner 456 then consults this bitmap, and only focuses on pages whose dirty bits are set, and are known to contain data structures of interest subject to integrity constraints. Novel integrity constraints and definitions of data structures of interest are further explained below. Moreover, by adjusting the frequency of scanning and by batch processing data pages 443, even more efficiency gains are observed, as further highlighted below.

Figure 5:
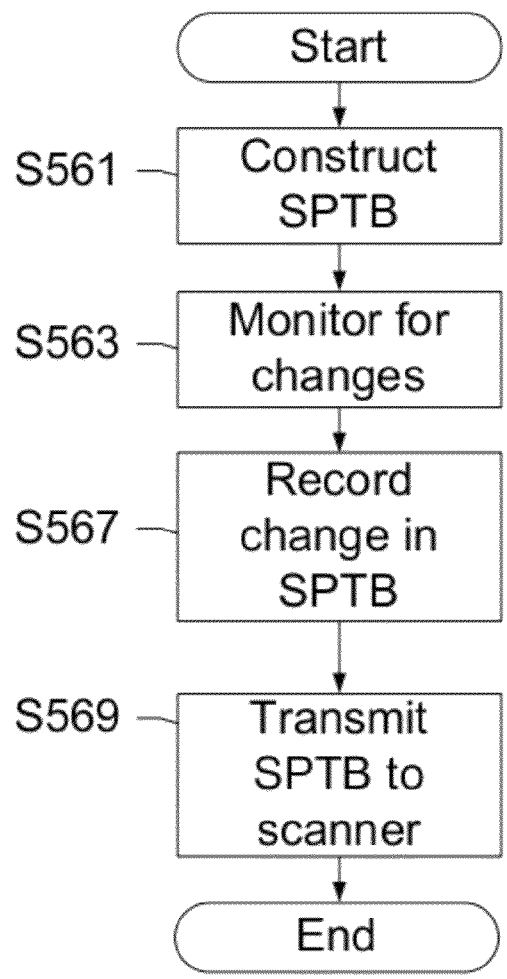
FIG. 5 shows a method for shadow page table optimization, according to an exemplary embodiment of the subject disclosure.

FIG. 5 shows a method for shadow page table optimization, according to an exemplary embodiment of the subject disclosure. As described above, the hypervisor constructs S561 a shadow page table bitmap (SPTB) to trap faults in modified pages. A Shadow Page Table (SPT) includes a radix tree, with a set of bits representing flags at each intermediate level of the tree, and with each leaf representing a page of memory. In other words, the SPT is a partial replica of the real page table, with modified flags enabling one to program how the device generates a fault. When a fault is detected, a bitmap, or an array of bits (one per page) is updated to record that a given page has been modified or written. This additional structure is the Shadow Page Table Bitmap (SPTB). First attempts to modify these pages are monitored in step S563. The corresponding bit of the SPTB is modified S567. A kernel integrity scanner then consults the SPTB S569, and only focuses on pages whose dirty bits are set, and are known to contain data structures of interest subject to integrity constraints.

The shadow page table optimization has a substantial effect on the number of checks performed by the scanner, thereby leading to reduced power consumption. In experiments using the LMBENCH tool for performance analysis, it was observed that during a 144 second workload, 25 rounds of checks were performed by the optimized version, rather than 5. In other words, for a similar workload (and consequently, power consumption), an optimized scanner verifies the integrity of the kernel data structures 5 times more frequently than the prior art.

According to the subject disclosure, the frequency of checks is adjusted by either periodic polling (where the period is configurable), and/or by event-based or interrupt-based notifications to trigger the malware scanner. These methods add efficiency by preventing the use of busy loops that burn too much CPU power, and overcome the deficiencies of sleep timers that ignore momentous events. Some existing code scanners, such as Patagonix, use event-based approaches to pause the guest domain each time a new page is scheduled for execution, and check the page for malware. However, the subject disclosure modifies such scanners to batch and perform these checks en masse. In contrast to frequently pausing the guest domain, batching enables detection of malicious code potentially after it has been executed, but ends up being far more efficient. Further, randomizing the period for polling and/or the number of events in a batch provides a further line of defense against savvy attackers, as is further described herein.

Figure 6:
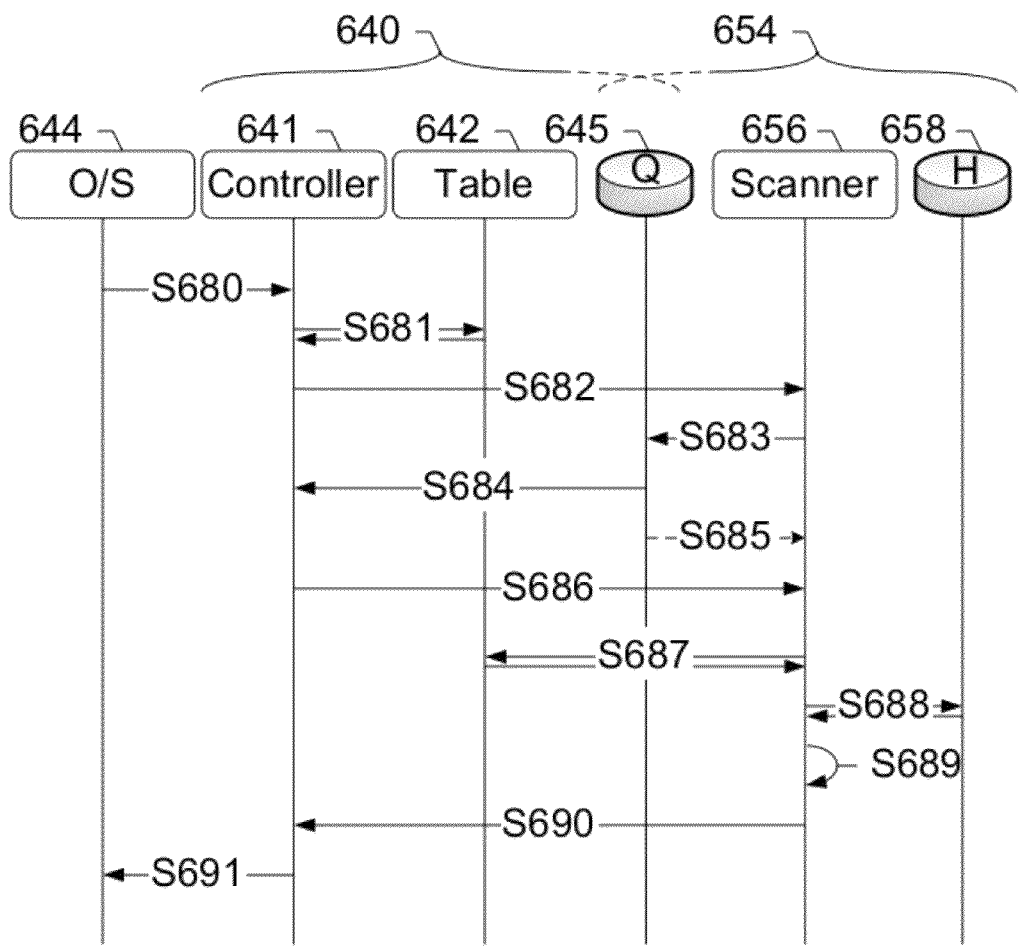
FIG. 6 shows a process flow diagram for scanning code integrity, according to an exemplary embodiment of the subject disclosure.

FIG. 6 shows a process flow diagram for modifying the frequency of checks, according to an exemplary embodiment of the subject disclosure. In this embodiment, an operating system (OS) 644 on a guest domain communicates with a hypervisor 640, including a controller 641, a page table 642, and a batch queue 645. Alternatively, batch queue 645 resides on a trusted domain 654, including a malware scanner 656 and a hash database 658. All these elements reside on a memory of a mobile device (not shown).

A code page scheduled for execution is intercepted S680 by controller 641 within hypervisor 640. Controller 641 determines by referring S681 to table 642 that this is a first execution of the code page, and modifies the corresponding NX-bit in table 642. Controller 641 then communicates S682 with scanner 656 in trusted domain 654 to either scan the page, or add it S683 to batch queue 645, depending upon the batch settings in place. This step may not be necessary if controller 641 is configured to automatically add the page to queue 645. When batch queue 645 is full, a notification is transmitted S684 to controller 641 that the queue is ready to be processed. Optionally, the notification is transmitted S685 directly to scanner 656. Even if queue 645 is not full, a timeout may occur, which indicates to the controller that a scan is required. In either case, controller 641 transmits an instruction S686 to scanner 656 to scan the contents of batch queue 645. Scanner 656 accesses S687 the NX-bit for each page in queue 645 from table 642, and hashes and compares S688 the executing code to a whitelist of known software stored in hash database 658. Scanner 656 then makes a determination S689 of whether or not the page is infected with a rootkit, this determination being known in the art. The determination is transmitted S690 back to the controller 641. In the case of infected code, controller 641 pauses the executing code S691, and raises an alert. Alternatively, scanner 656 may raise the alert. In the case of non-infected code, database 658 is updated with the new information for the code page, and the page is allowed to execute. This type of batch scanning substantially conserves processor and battery resources as further shown below.

Figure 7:
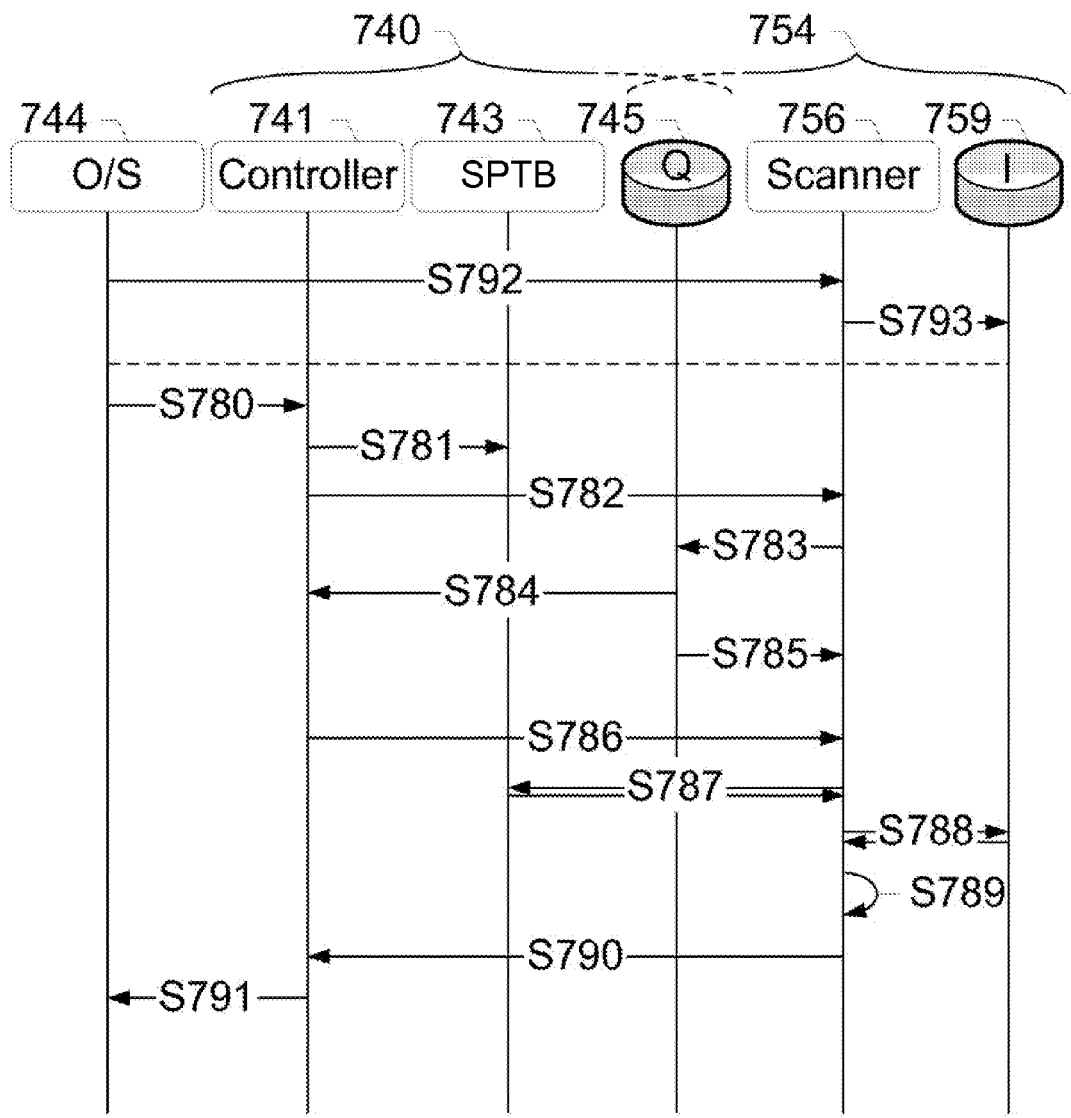
FIG. 7 shows a process flow diagram for scanning data integrity, according to an exemplary embodiment of the subject disclosure.

FIG. 7 shows a process flow diagram for checking integrity of kernel data, according to an exemplary embodiment of the subject disclosure. An operating system (OS) 744 on a guest domain communicates with a hypervisor 740, including a controller 741, a shadow page table bitmap (SPTB) 743, and a batch queue 745. Alternatively, batch queue 745 resides on a trusted domain 754, including a malware scanner 756 and a database of invariants 759. All these elements reside on a memory of a mobile device (not shown).

The process begins with a training phase for scanner 756, such as Gibraltar. Scanner 756 is trained S792 against multiple executions of OS code and data, resulting in a large number of invariants that is populated S793 in invariant database 759. After this training process, during normal operation, a data page scheduled for modification is intercepted S780 by controller 741 within hypervisor 740. Controller 741 determines by referring S781 to table 743 that this is a first modification of the data page, and appends a corresponding "dirty bit" in SPTB 743. Controller 741 then communicates S782 with scanner 756 in trusted domain 754 to either scan the page, or add it to batch queue 745, depending upon the batch settings in place. This step may not be necessary if controller 741 is configured to automatically add the page S783 to queue 745. Scanner 756 only adds vital data pages to queue 745. These vital data pages include kernel static data, linked lists, and function pointers. Limiting batch queue 745 to only vital data pages enables large power savings as shown further below. When batch queue 745 is full, a notification is transmitted S784 to controller 741 that the queue is ready to be processed. Optionally, the notification is transmitted S785 directly to scanner 756. Even if queue 745 is not full, a timeout may occur, which indicates to the controller that a scan is required. In either case, controller 741 transmits an instruction S786 to scanner 756 to scan the contents of batch queue 745. Scanner 756 accesses S787 the SPTB 743 indicating which data page in queue 745 has been modified, and checks S788 the integrity of the data with invariant database 759 as described herein. Scanner 756 then makes a determination S789 of whether or not the kernel data page is infected (or highly likely infected) with a rootkit using conventional methods known in the art. The determination is transmitted S790 back to the controller 741. In the case of infected code, controller 741 pauses the system S791, and raises an alert. Alternatively, scanner 756 may raise the alert. In the case of non-infected data, invariant database 759 is updated with the new information for the data page. This type of batch scanning of only vital data substantially conserves processor and battery resources as further shown below.

As described above, the subject disclosure modifies existing rootkit detectors by controlling a frequency of scanning, and a surface of attack that is to be scanned. Further a balanced profile for scanning is achieved by determining a window of vulnerability, and adjusting the frequency and attack surface to minimize the window of vulnerability while maximizing battery life. The window of vulnerability for a given object is defined as the time elapsed between two consecutive checks on that object. For example, checking the kernel system call table every two seconds gives a rootkit a maximum of two seconds to hijack the system call table, steal user information written to a file via the "write( )" command, and optionally restore the table to its pristine state to avoid detection. The window of vulnerability is therefore two seconds. For security systems that check multiple components, the window of vulnerability metrics of each component (each code page or each data structure in this case) may be statistically aggregated into a system-wide value. In other words, a window of vulnerability may be averaged over all components in a system.

Periodic polling systems have a clearly defined set of windows of vulnerability that they expose for each object they check. For a polling period T, the average window of vulnerability will be at least T, plus processing time involved within each round. However, event based systems such as the ones described herein provide a greater degree of assurance. If the hardware immediately alerts the monitor of a potential thread even before it is allowed to happen, then the system effectively provides zero vulnerability. For this reason, the subject disclosure provides interrupt batching for a processor, or signal handling for UNIX processes. In this case, the window of vulnerability widens again depending on the amount of merging performed, or the size of the batch.

A resourceful and knowledgeable author of malware may "learn" the timing mode and parameters of the system, and may craft attacks that break in, exploit, and clean up within the period of time during which security checks are inactive. The subject disclosure recognizes this risk, and mitigates any potential attacks by randomizing the timing parameters. For example, instead of configuring a data integrity scanner like Gibraltar to scan data structures every T seconds, a controller is programmed to trigger checks at an interval determined from a uniform distribution in the interval (T−M, T+M], with M<=T. In other words, the period T is randomly adjusted to between T−M to T+M, with T and M being any values protected from the guest kernel. In one exemplary embodiment, a proper uniform distribution may be generated by using a count of hardware interrupts. Other embodiments may use any source of entropy that is protected from the guest kernel. Because the checking intervals are uniformly distributed in the interval (T−M, T+M], windows of vulnerability and checking overhead will converge to the same values as if a fixed period of T seconds had been chosen.

A similar randomization may be applied to event-based timing modes. The randomization is applied to the number of events that will trigger security checks. This approach may be further augmented with an explicit timeout (which itself could be randomized, if necessary). Moreover, a similar approach may be used to vary the attack surface: randomly triggering coverage of a wider attack surface is useful in catching potential attackers off-guard.

Experimental results shown below use a setup including a Viliv S5 mobile device, equipped with an Intel Atom Z520 1.33 GHz processor rated at 1.5 W, a 4.8" touchscreen, 32 GB hard drive, 1 GB of memory, Wi-Fi and BLUETOOTH transceivers in addition to a 3G modem, GPS, and a battery rated at 24,000 mWh. This mobile device used Xen paravirtualization, with a Xen 3.4.2 hypervisor, a Fedora 12 stack running a version of Lunix 2.6.27.42 on a trusted domain, and added support for both Patagonix and Gibraltar on this domain. The guest domain ran Linux 2.6.27.5 with Xen paravirtualization patches under a Cent)S 5.5 distribution. Power was measured with a Tektronix TDS-3014 oscilloscope with a Hall effect current probe. The device was powered directly from a 5V source to ensure that the measured current was directly powering the device. The current probe was attached to the charging cord, and a laptop connected to the oscilloscope recorded the current readings over the time of the experiment. It is to be understood that these specifications are for experimental purposes only, and that equivalent hardware and software would achieve similar results. It is to be further understood that the overhead of executing a hypervisor as opposed to a native kernel is negligible.

The experimental workload used to evaluate performance aimed to replicate standard mobile usage by loading a series of popular web pages and checking email. For completeness, the workload included using both 3G and Wi-Fi connectivity, as well as using an IMBENCH CPU workload designed to measure OS performance. The workload is therefore highly customizable, and independent of specific platforms, needing merely the ability to launch browser and email client instances from a script. Other workload configurations are possible and are likely to confirm the experimental results provided herein.

Figure 8A:
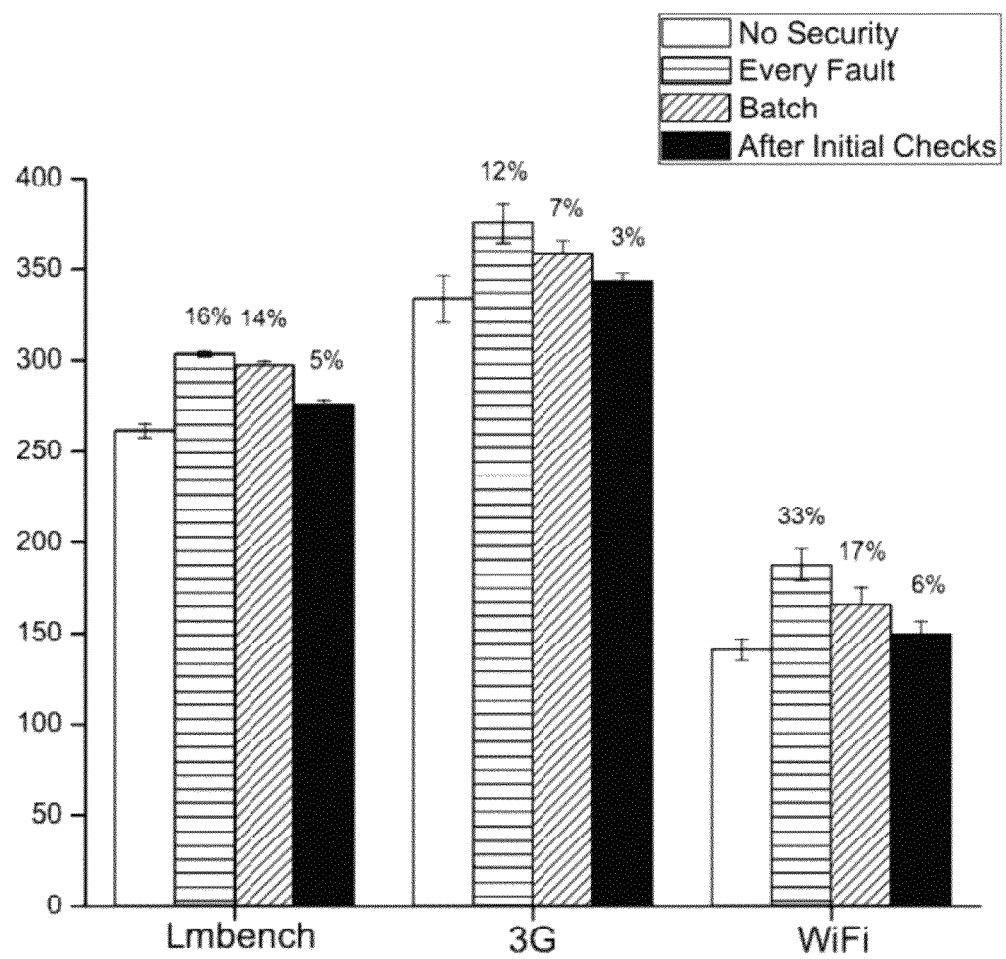
FIGS. 8A-8B show experimental results of modifying the frequency of checks for a code scanner, according to an exemplary embodiment of the subject disclosure.
Figure 8B:
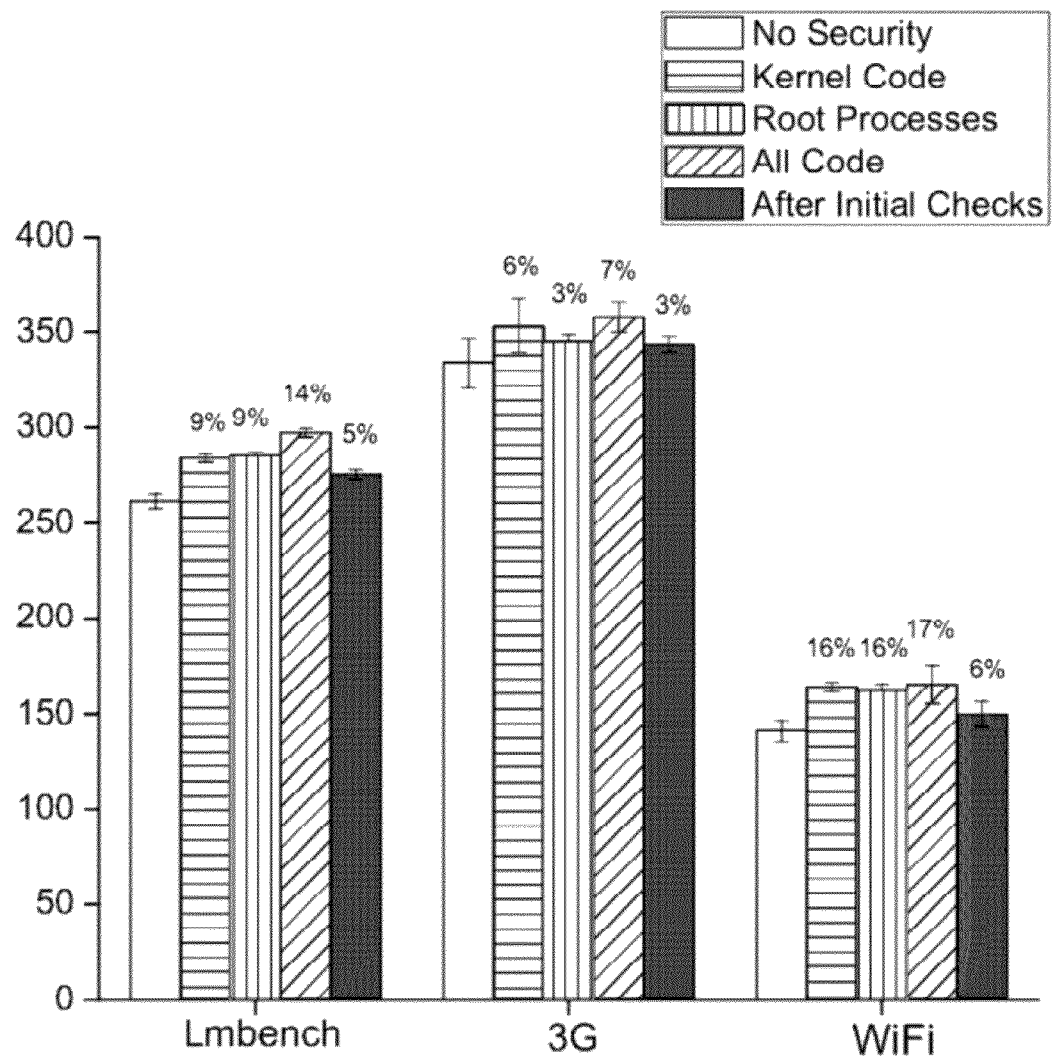

FIGS. 8A-8B show experimental results of modifying the frequency of checks for a code scanner, according to an exemplary embodiment of the subject disclosure. FIG. 8A shows the impact of varying the frequency of code integrity checks using Patagonix as the rootkit scanner. It is observed that batching code integrity checks results in a net decrease in energy dissipation for the scanner. This may be attributed primarily to the decrease in context switches. Each notification of an executing page triggers a context switch to the trusted domain. Adding pages to a queue maintained in the hypervisor (or in the trusted domain) and processing them only when the queue is full minimizes the number of context switches. In the present embodiment, the maximum number of entries a single 4 KB x86 memory page can hold is 341, thereby dictating the maximum size of the queue. In this embodiment, a 99% decrease in the number of context switches shows the largest impact in the Wi-Fi workload.

Quantitatively, the Patagonix overhead decrease from the equivalent of placing a 38 second phone call to the equivalent of placing a 22 second phone call.

FIG. 8B shows that these results hold as the coverage surface of code integrity checks is varied. It is also noted that subsequent executions of the workloads requires no additional code verifications by the scanner, resulting in decreased energy expenditures up to a minimum of 3% for 3G browsing. Therefore, batching allows code to execute for a period of time without being modified, opening up a window of vulnerability that is fairly small. To counter this, an event-based queue is complemented with a timer. The timer ensures that a queue that may never completely fill up is still processed. Results show that a timer of 5 seconds provides a sufficiently small window of vulnerability.

Figure 9A:
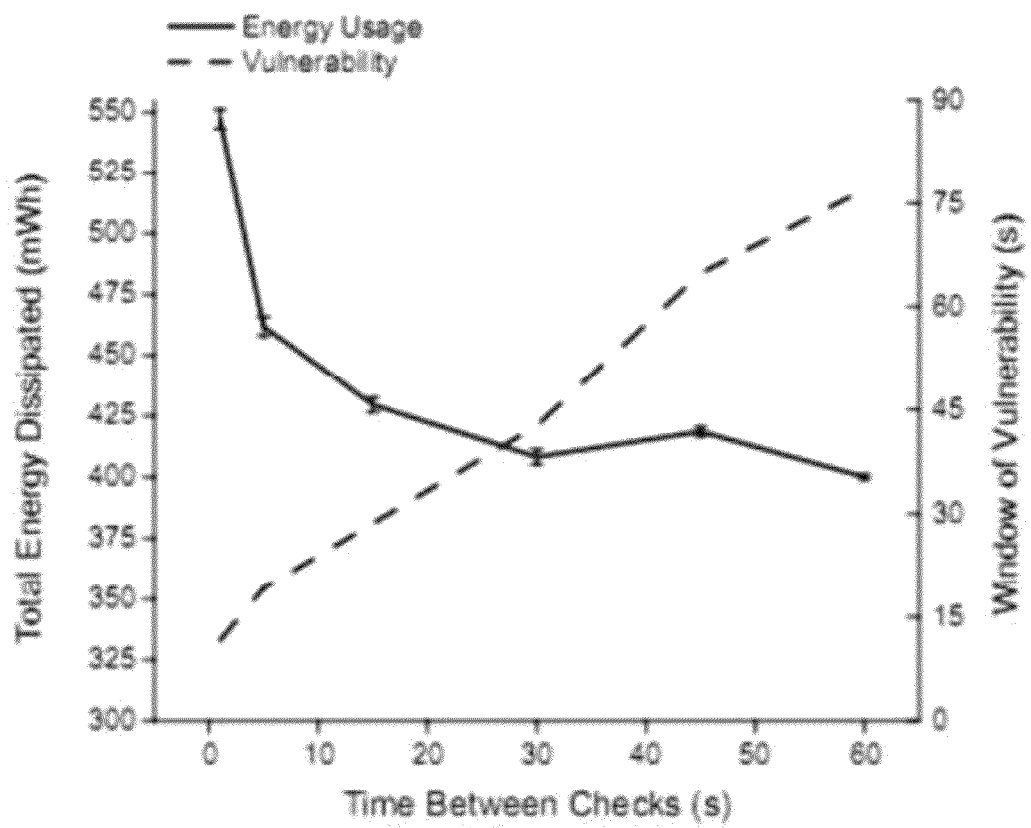
FIGS. 9A-9C show experimental results of modifying the period between data integrity checks, according to an exemplary embodiment of the subject disclosure.
Figure 9B:
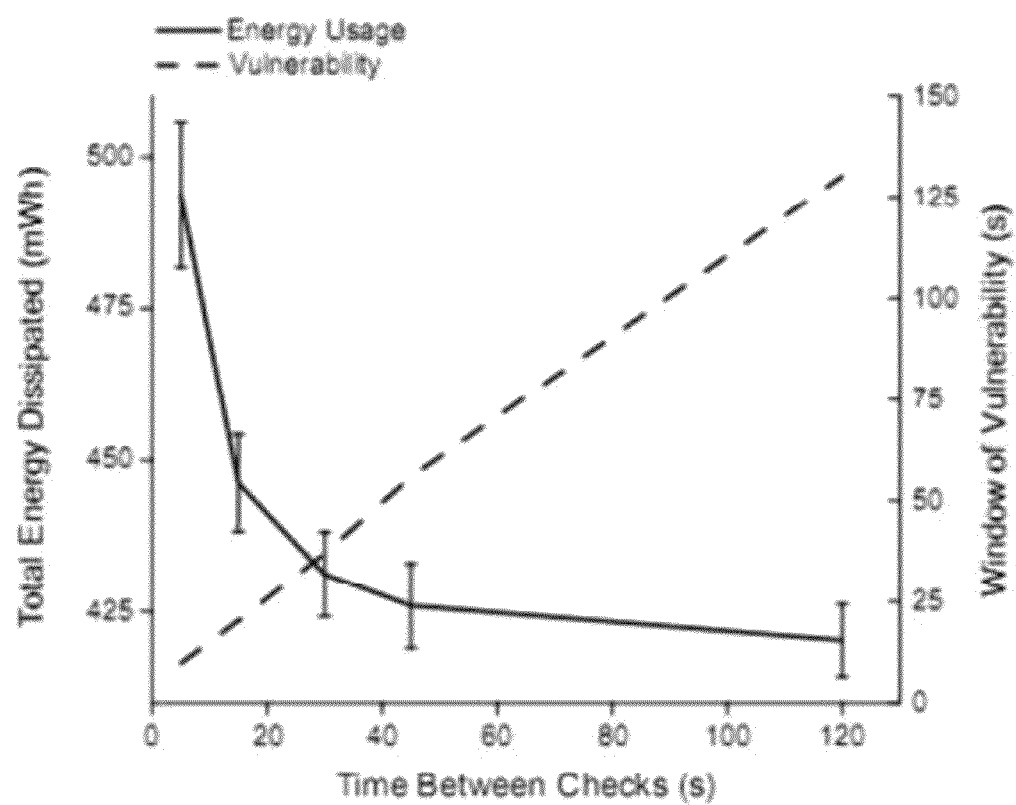
Figure 9C:
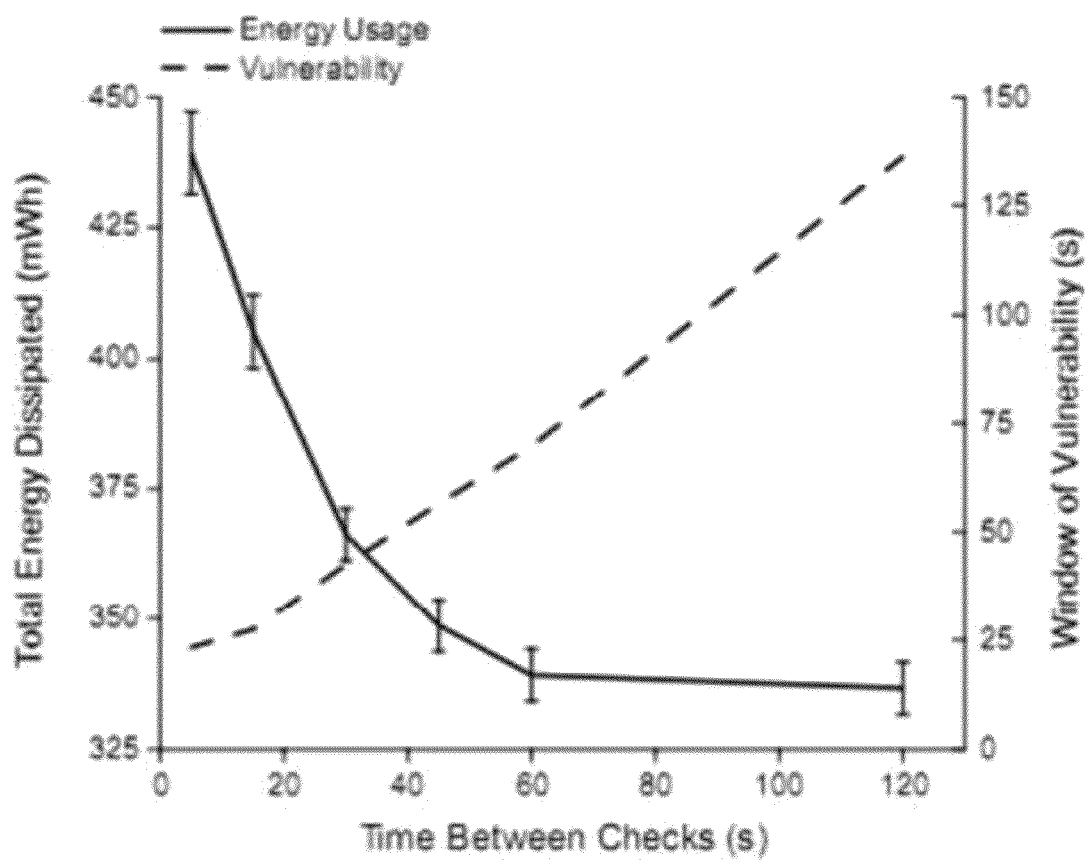

FIGS. 9A-9C show the impact on energy and security when varying the period between data integrity checks, according to an exemplary embodiment of the subject disclosure. An integrity scanner such as Gibraltar is triggered every time T seconds elapse between detection rounds, where T is represented on the x-axis. As the energy spent decreases, the window of vulnerability increases at a quasi-linear rate depending on the time between detection rounds. As described above, Gibraltar is modified to poll kernel data structures by either using a polling period T (seconds) or by an event triggered by a filled queue. Referring to FIG. 9A, the solid line represents the energy dissipated by the workloads executing in a guest domain monitored by Gibraltar, with different polling periods T varying between 0, 5, 15, 30, 45, 60, and 120 seconds. The broken line represents the average window of vulnerability in the system. Increasing T results in less frequent rounds of verification, increasing battery life and decreasing the overall security of the system by opening wider windows of vulnerability. Recall that the average window of vulnerability is the mean of the times elapsed between consecutive integrity checks for each kernel data structure. The lower bound for the window of vulnerability is thus T, plus a small quantity derived from the time spent within each verification round. FIGS. 9B and 9C show similar results for 3G browsing and Wi-Fi browsing, respectively.

Figure 10A:
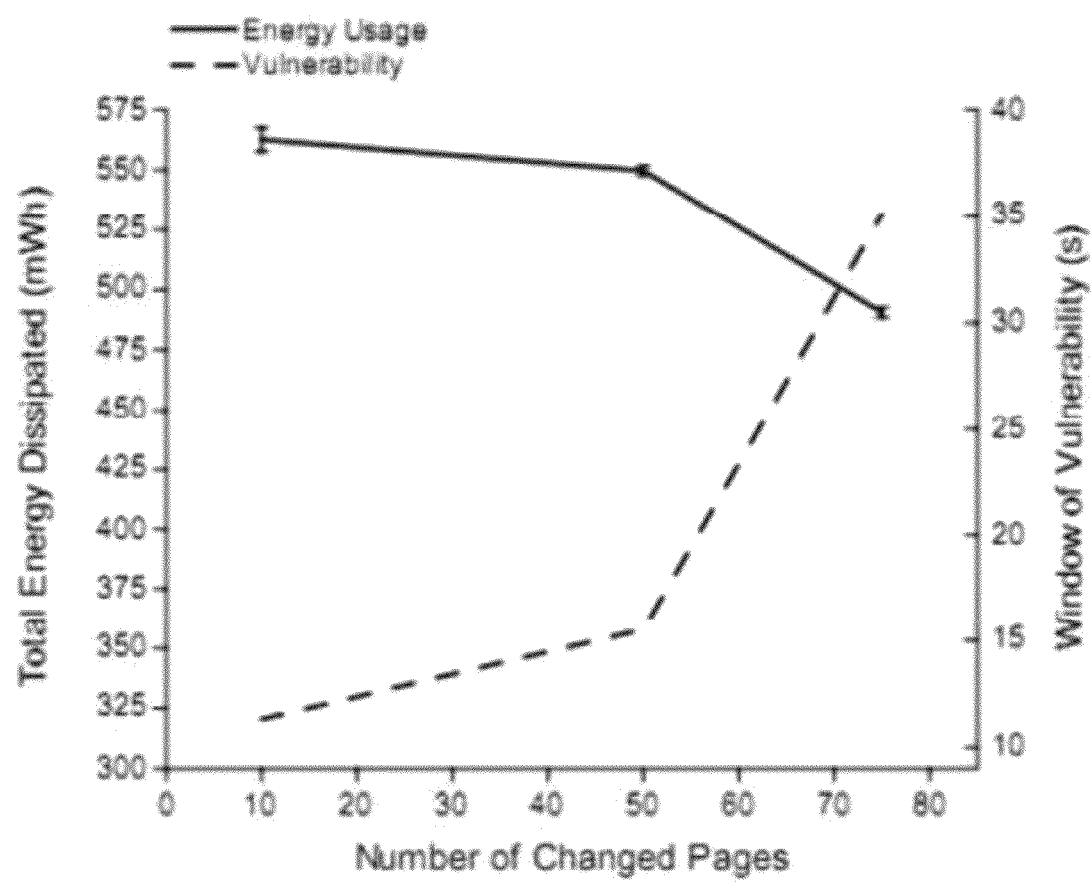
FIGS. 10A-10C show the impact on energy and security when varying the threshold of dirty pages for data integrity checks, according to an exemplary embodiment of the subject disclosure.
Figure 10B:
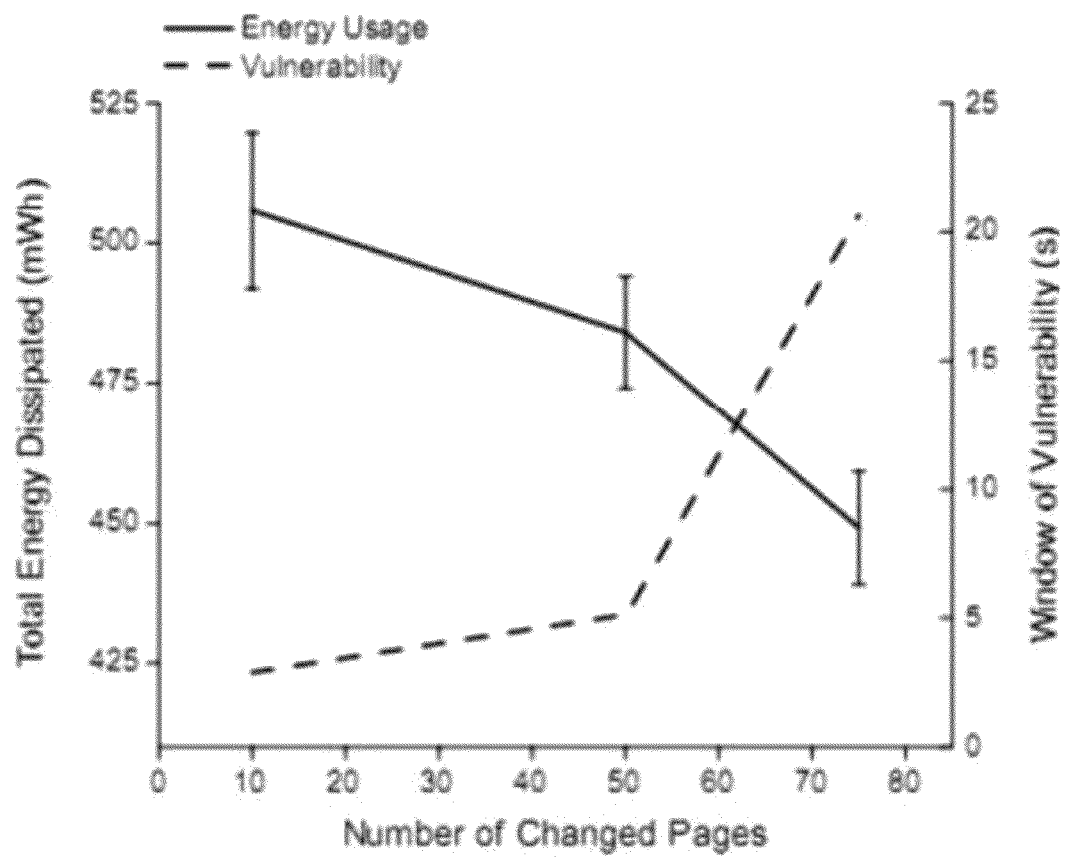
Figure 10C:
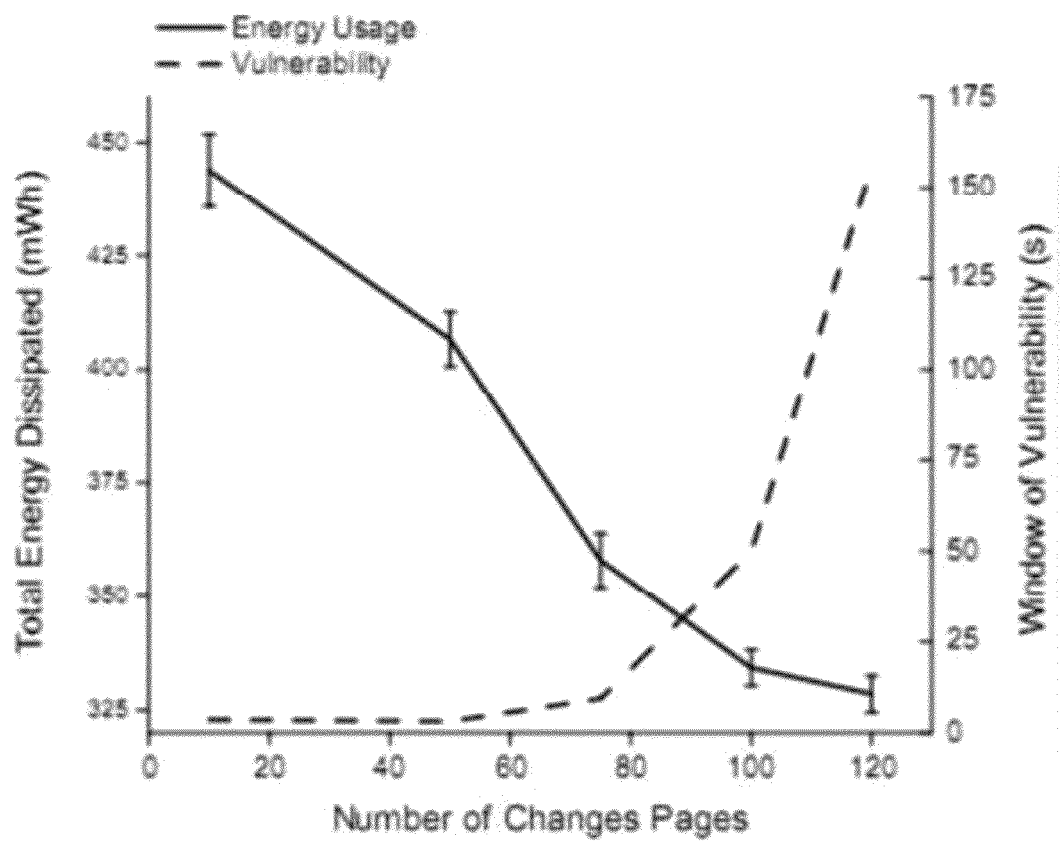

FIGS. 10A-10C show the impact on energy and security when varying the threshold of dirty pages for data integrity checks, according to an exemplary embodiment of the subject disclosure. A scanner such as Gibraltar is triggered every time N pages change, with N being represented on the X-axis. N varies between 10, 50, 75, 100, and 120 pages. Both the LMBENCH and 3G browsing workloads to not trigger detection rounds for N=100 or 120 pages, because these workloads repeatedly modify the same set of 75 to 99 kernel pages. It is noticed that as the value of N increases, the amount of time between detection rounds also increases, and a similar phenomenon is observed as in the polling case: energy overhead is traded off for an increase in the window of vulnerability in the kernel. Because the rate of kernel page modification is not linear, windows of vulnerability increase non-linearly as well.

The subject disclosure provides similar results for an experimental setup to test the impact on the size of the attack surface, using an identical experimental setup as described above. With rootkits, attacks that modify kernel code, static data, and data structures that hold control data (e.g. the system call table) are more abundant and easy to program than attacks that modify arbitrary kernel data structures. The subject disclosure modifies existing scanners by limiting the attack surface size to include at least function pointers, as opposed to other data structures. The energy dissipated by a security tool can be reduced by decreasing the fraction of the attack surface monitored.

Figure 11A:
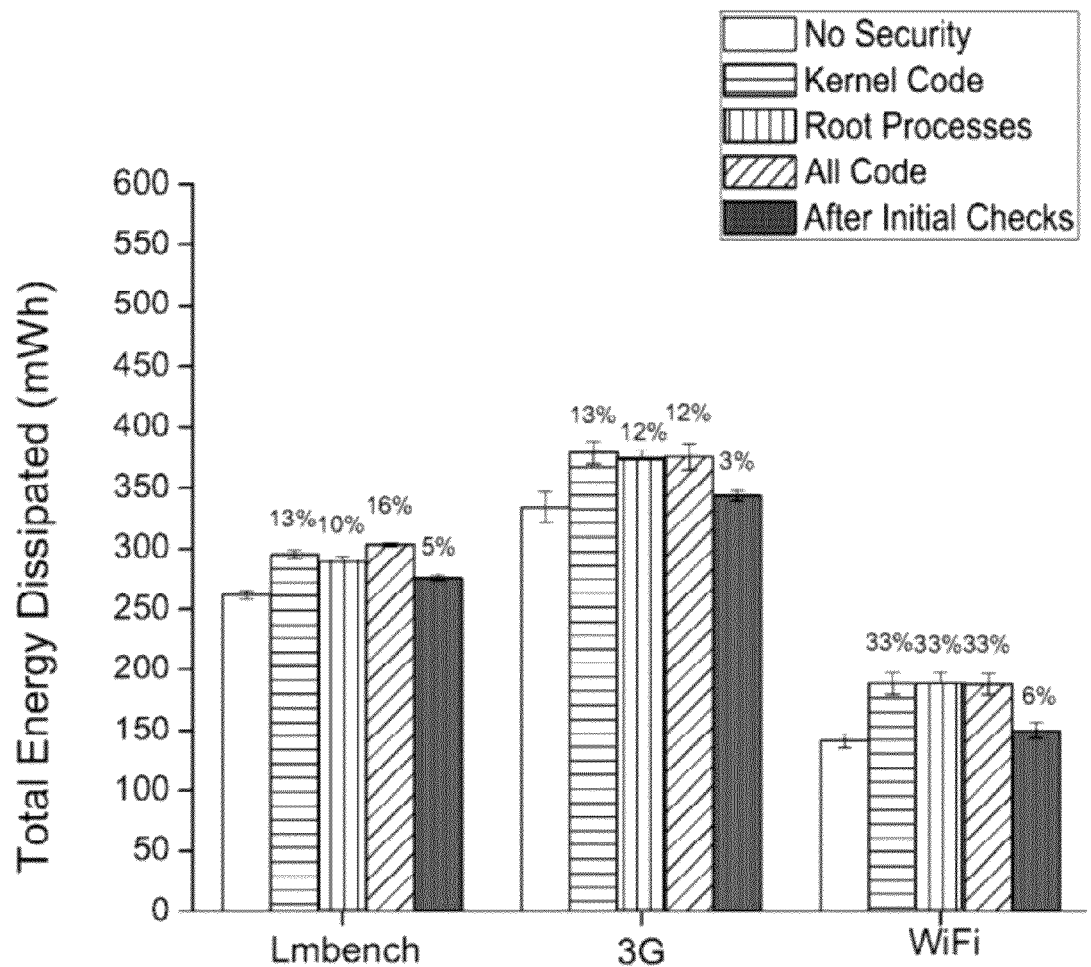
FIGS. 11A-11B show the impact of varying the attack surface on the total energy dissipated by code and data integrity checks respectively, according to an exemplary embodiment of the subject disclosure.
Figure 11B:
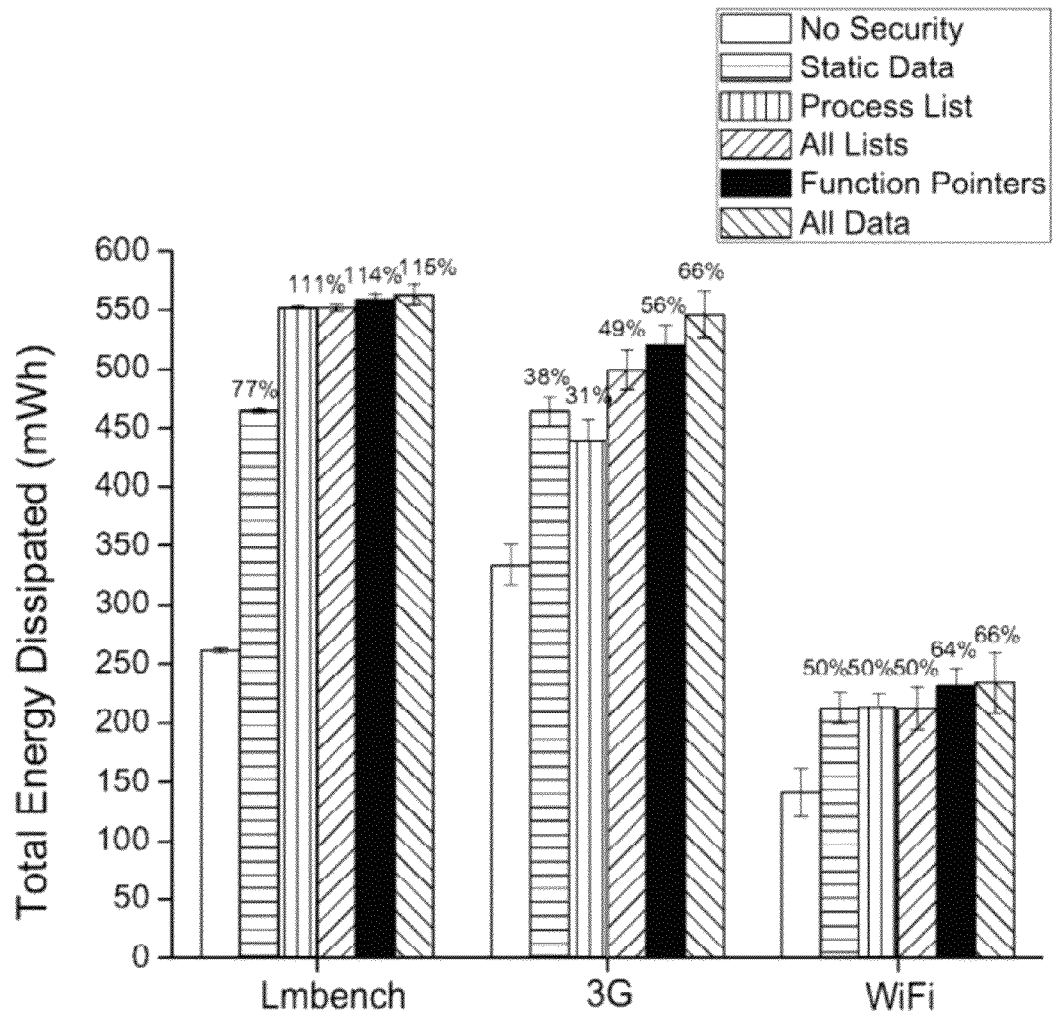

FIGS. 11A-11B show the impact of varying the attack surface on the total energy dissipated by code and data integrity checks respectively, according to an exemplary embodiment of the subject disclosure. As described above, the energy dissipated by a security tool is reduced by decreasing the fraction of the attack surface monitored. The subject disclosure quantifies this observation by considering the attack surface of both code and data. Referring to FIG. 11A, a code scanner such as Patagonix monitored three subsets of the attack surface: kernel code only, kernel code and root processes, and all code on the system including kernel code, root, and non-root processes. Each code page was set up for scanning as soon as it was executed, i.e. no adjustment was made to a frequency of scanning. The leftmost column in each workload is the baseline, where no security measures are in place. It is observed that extra energy dissipated when all checking all code for a 144-second Wi-Fi workload is the same as placing a 38 second phone call, or sending 7 SMS messages. Additionally, once Patagonix verifies the integrity of a code page, so long as the running process remains resident in memory and the code is not modified, Patagonix will not need to verify this page again, thereby incurring no further overhead. This is particularly true for the kernel, which after booting remains resident and unchanged. This is represented by the rightmost column in each workload.

Referring now to FIG. 11B, an integrity scanner such as Gibraltar was configured to monitor five classes of kernel data, containing a) static kernel data, i.e. data that is initialized during kernel boot-up and persists throughout execution of the kernel, b) data structures representing the process list, c) all linked lists, d) all kernel data structures that store function pointers, and e) all data structures. Each class is inclusive, i.e. includes the previous class as a subset. Again, the scanner is set up to continuously monitor data integrity (without adjustments to scanning frequency), and one complete traversal of the kernel's data segment is referred to as a detection round. It is observed that although the total energy dissipated by Gibraltar is significantly higher than Patagonix (likely because Gibraltar continuously contends for CPU cycles), the energy dissipated by Gibraltar varies considerably with the attack surface being monitored. Essentially, the larger the attack surfaces the scanner has to cover, the more adversarial the workload is in terms of memory locality. Decreased memory locality impacts processor cache performance efficiency, and therefore energy efficiency.

Figure 12A:
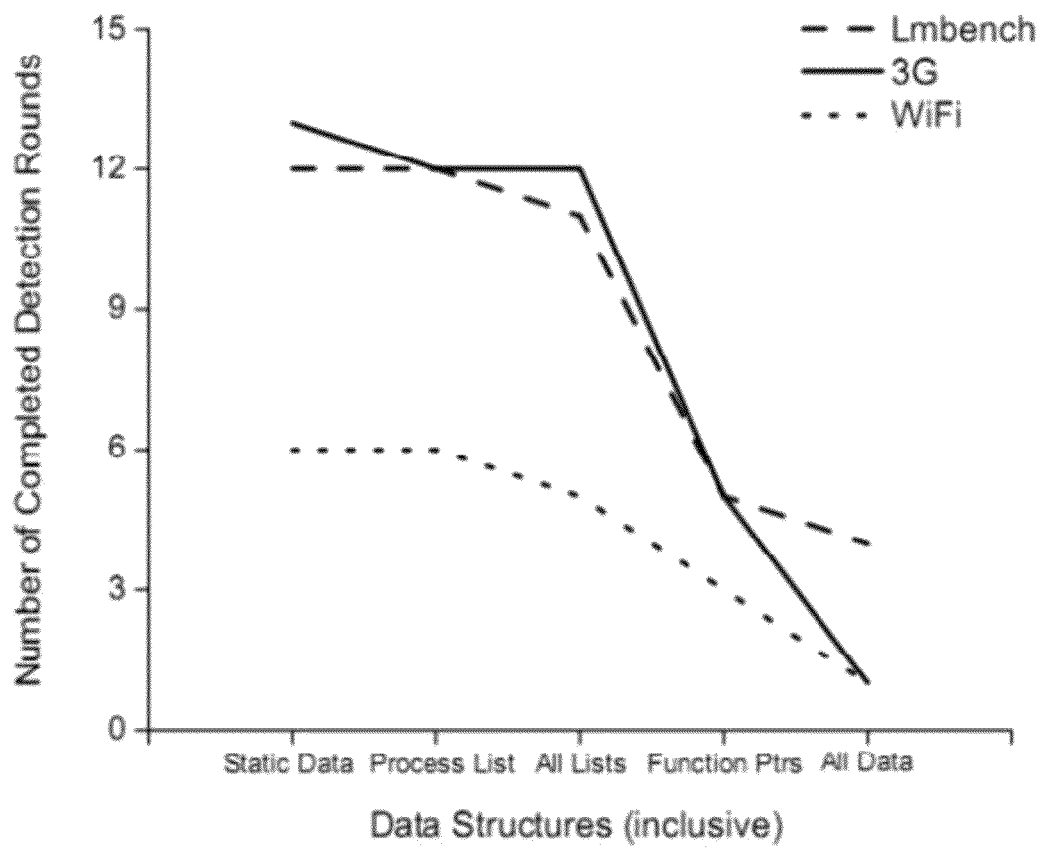
FIGS. 12A-12B show the number of detection rounds and energy overhead per detection round for a data integrity scanner, according to an exemplary embodiment of the subject disclosure.
Figure 12B:
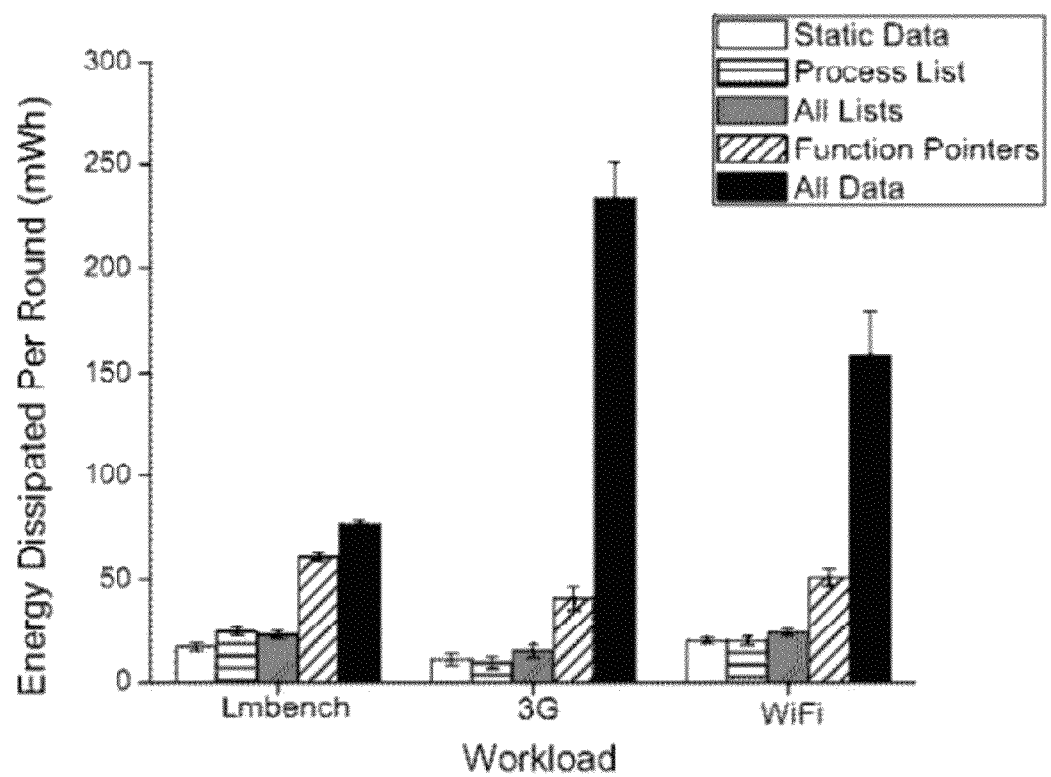

FIGS. 12A-12B show the impact of varying the attack surface for kernel data integrity checks on the energy dissipated per detection round, and the number of completed detection rounds respectively. Again, each data class includes the previous class. As data classes are added to the attack surface being monitored, the number of detection rounds completed decreases, and the energy per round increases. Referring to FIG. 12A, it is observed that when monitoring a smaller attack surface, data structures are checked more frequently, presenting a smaller window of vulnerability to attackers. Referring to FIG. 12B, it is observed that the energy per round spent during the verification of kernel static data, linked lists, and function pointers is significantly lower than that spent checking all data. This is especially evident for the 3G and Wi-Fi browsing workloads, which dissipate approximately 3 to 5 times less energy than when Gibraltar monitors all data structures. This result is significant because over 90% of rootkits operate by violating the integrity of static data, linked lists, or function pointers. As a consequence, the inventive modification to Gibraltar enables protection against most known attacks with modest energy dissipation per round. Further, as shown above, spacing out the frequency of detection rounds by polling and batching provides more efficient scanning.

The subject disclosure uses these experimental results to construct profiles that end-users may select or adjust to best protect their mobile devices. Energy costs associated with checking code integrity are much lower than the cost of checking data integrity. A reasonable tradeoff may be achieved between energy efficiency and a window of vulnerability for data integrity scanners, with a sweet spot for realistic browsing workloads using a polling interval of 30 seconds. These metrics are used to construct a "balanced profile" for moderate energy consumption with a high degree of assurance against most rootkit attacks. This profile combines batched checks of kernel code pages, with polling-based integrity checks of static kernel data, linked lists, and data structures containing function pointers, using the T=30 s period identified above. Such a balanced profile has been experimentally shown to have windows of vulnerability for kernel code varying between 0.7 and 2.5 seconds, and windows of vulnerability for kernel data averaging 40 seconds. Moreover, a maximum energy overhead reaches about 14%, with web browsing hovering between 6% and 9%.

Figure 13:
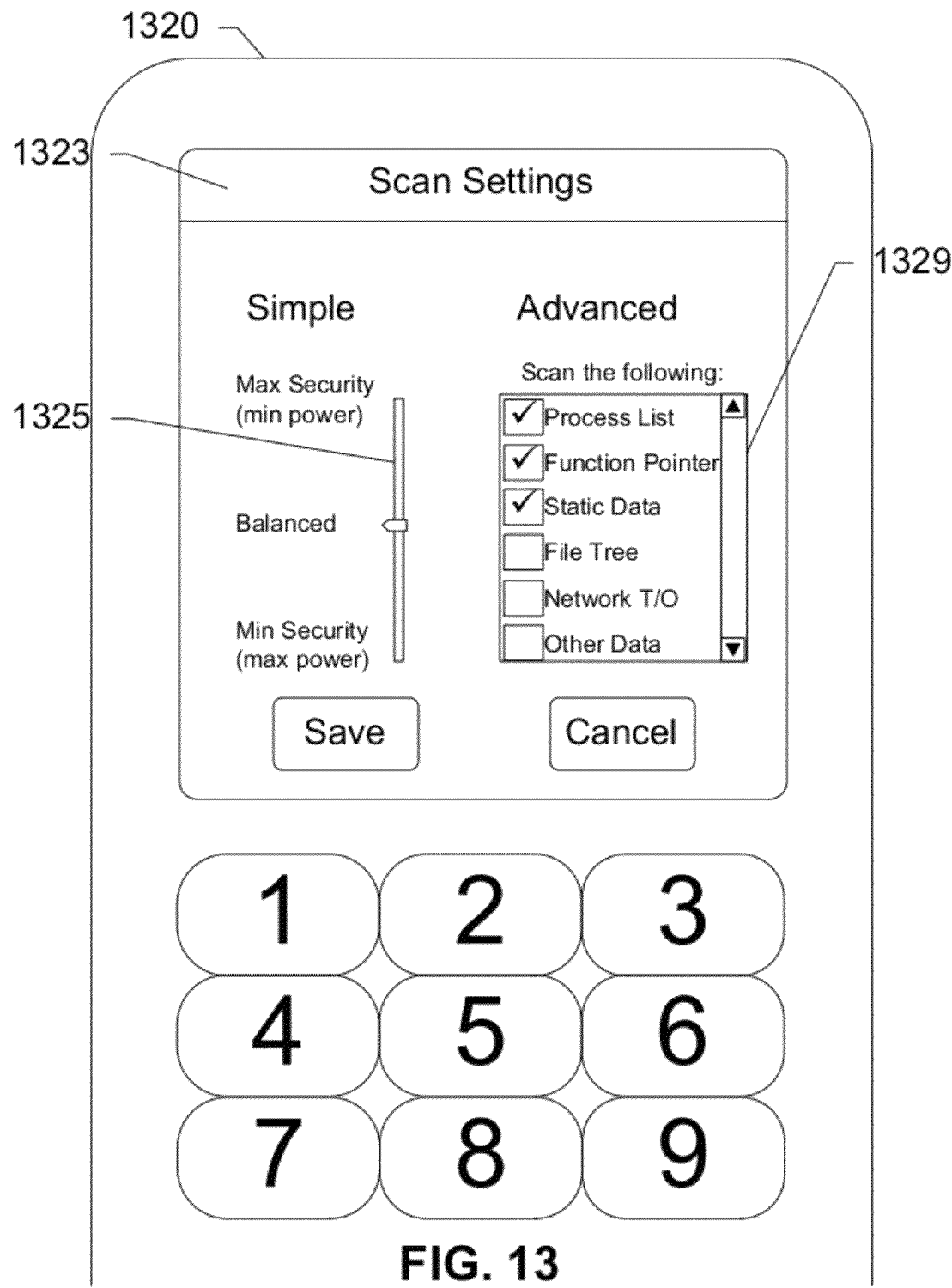
FIG. 13 shows a user interface for selecting a balanced profile on a mobile device, according to an exemplary embodiment of the subject disclosure.

FIG. 13 shows a user interface for selecting a balanced profile on a mobile device 1320, according to an exemplary embodiment of the subject disclosure. Mobile device 1320 includes a malware scan settings application 1323 that is accessible by accessing the trusted domain on the hypervisor. Alternatively, this user interface for malware scan settings application 1323 may be limited to service technicians, or may only be unlocked by authorized users. In either case, a user is presented with an ability to adjust a simple slider 1325 to choose among a balanced profile, a maximum security profile, a minimum security profile, or anywhere in between. The adjustments for each setting are determined based on the experimental results shown above, and can further be adjusted depending upon the particular hardware and operating system of mobile device 1320. The user may further adjust advanced controls 1329, such as determining which particular data to scan, adjusting a timeout period for the timer, or specifying a batch queue size, as described above.

In other embodiments, malware scan settings are implemented as hardware controls on the exterior of the mobile device. For example, a hardware slider is attached to the exterior of the mobile device for the user to adjust the security level between more protection and more battery life. Such a hardware control allows the OS of the guest domain to remain on the screen of the mobile device while the button controls the trusted domain to adjust the security level. Further, in case the mobile device is plugged into a constant power source, for instance while the battery is charging, the time period between scans, the size of the batch, and the attack surface are automatically adjusted to provide a maximum level of security.

In conclusion, protecting against code-driven attacks is relatively cheap, while protecting against all data-driven attacks is prohibitively expensive. A sweet spot in the security/energy tradeoff minimizes both energy consumption and the window of vulnerability. Further, the inventive modifications to existing detectors may be complemented with other methods to sidestep the security-energy tradeoff for detecting certain kinds of malware. For instance, the subject disclosure may be combined with behavior-based techniques such as observing activities on the untrusted domain, including SMS message forwarding, spam email, etc., and generating power profiles for detection of any similar suspicious activity. An adaptive security/energy profile may be generated to complement the above-discussed balanced profile. The subject disclosure may further be combined with pre-emptive approaches to detect and discard large fractions of malware before they ever reach the mobile device. Such techniques can complement host-based detectors that can run using conservative security/energy profiles when "trusted" applications are downloaded and executed. Malware scan settings may be adjusted through a web portal, an application within the trusted domain on the mobile device, or a hardware control on the mobile device.

The foregoing disclosure of the exemplary embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A method comprising:
   determining, by a mobile device comprising a processor, an amount of energy consumed during a rootkit detection;
   determining, by the processor, an aggregate window of vulnerability for the mobile device, the aggregate window of vulnerability being based on a plurality of windows of vulnerability for a corresponding plurality of pages on a memory of the mobile device; and
   adjusting, by the processor, one of a frequency or an attack surface of the rootkit detection based in part on the aggregate window of vulnerability and the amount of energy consumed.

2. The method of claim 1, further comprising comparing the amount of energy consumed with a maximum threshold and a minimum threshold.

3. The method of claim 2, wherein the frequency and the attack surface are increased when the amount of energy consumed is below the minimum threshold.

4. The method of claim 2, wherein the frequency and the attack surface are decreased when the amount of energy consumed is below the minimum threshold.

5. The method of claim 1, further comprising:
   generating a shadow page table on a hypervisor on the memory;
   recording a modification of a kernel data page on the hypervisor; and
   detecting for rootkits on the modified kernel data page.

6. The method of claim 1, wherein adjusting the frequency of rootkit detection comprises one or more of defining a period between detection and defining an event to trigger a detection, wherein the event comprises reaching a quota of pages that are undetected.

7. The method of claim 1, wherein adjusting the frequency of rootkit detection further comprises batch processing a plurality of events at a completion of one or more of a batch period and a batch amount.

8. The method of claim 7, wherein each window of vulnerability comprises a function of one or more of the period between detection, the batch period, and a processing time involved for each detection.

9. The method of claim 8, wherein the frequency and attack surface are adjusted to minimize the amount of energy consumed and the window of vulnerability.

10. The method of claim 1, wherein adjusting the attack surface comprises limiting the rootkit detection to one or more of: executable code pages, root processes, function pointers, kernel data pages, or static data.

11. The method of claim 1, further comprising providing a user interface to adjust the frequency of detection and the attack surface.

12. The method of claim 9, further comprising randomizing one or both of the frequency or the attack surface.

13. A non-transitory tangible computer-readable medium having stored thereon instructions that, when executed by a processor, cause the processor to perform operations comprising:
   determining an amount of energy consumed during a rootkit detection, on a mobile device;
   determining an average window of vulnerability for a plurality of rootkit detections of a plurality of pages on the mobile device; and
   adjusting one of a frequency or an attack surface of the rootkit detection based in part on the aggregate window of vulnerability and the amount of energy consumed.

14. The non-transitory tangible computer-readable medium of claim 13, further comprising comparing the amount of energy consumed with a maximum threshold and a minimum threshold.

15. The non-transitory tangible computer-readable medium of claim 14, wherein the frequency and the attack surface are increased when the amount of energy consumed is below the minimum threshold.

16. The non-transitory tangible computer-readable medium of claim 15, wherein the frequency and the attack surface are decreased when the amount of energy consumed is below the minimum threshold.

17. A mobile device, comprising:
   a processor; and
   a memory in communication with the processor, the memory to store instructions that, when executed by the processor, cause the processor to perform operations comprising:
      determining an amount of energy consumed during a rootkit detection;
      adjusting a frequency of the rootkit detection; and
      adjusting an attack surface to be detected during the rootkit detection;
   wherein the adjustments are based in part on an aggregate window of vulnerability and the amount of energy consumed, the aggregate window of vulnerability being based on a plurality of windows of vulnerability for a corresponding plurality of rootkit detections.

18. The mobile device of claim 17, further comprising a database on the trusted domain, the database storing one or both of a whitelist and a table of invariants, the whitelist comprising a table of hashes for all binaries within the guest domain.

19. The mobile device of claim 17, wherein the operations further comprise measuring a power level of a battery to determine the energy consumed.

20. The mobile device of claim 17, further comprising a hardware slider coupled to the mobile device to enable adjustment of the frequency and the attack surface.

* * * * *